United States Patent
Miyakawa

(10) Patent No.: US 8,543,056 B2
(45) Date of Patent: Sep. 24, 2013

(54) COMMUNICATION DEVICE, COMMUNICATION METHOD, AND PROGRAM

(75) Inventor: Keiichiro Miyakawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 360 days.

(21) Appl. No.: 12/721,739

(22) Filed: Mar. 11, 2010

(65) Prior Publication Data

US 2010/0248624 A1 Sep. 30, 2010

(30) Foreign Application Priority Data

Mar. 25, 2009 (JP) ............................... P2009-074054

(51) Int. Cl.
*H04B 5/00* (2006.01)
*G06K 19/06* (2006.01)

(52) U.S. Cl.
USPC ........................................ 455/41.1; 235/492

(58) Field of Classification Search
USPC ....................................................... 455/41.1
See application file for complete search history.

(56) References Cited

U.S. PATENT DOCUMENTS

| | | | | |
|---|---|---|---|---|
| 6,157,024 A | * | 12/2000 | Chapdelaine et al. | 250/221 |
| 2004/0213169 A1 | * | 10/2004 | Allard et al. | 370/276 |
| 2006/0038024 A1 | * | 2/2006 | Nakadai et al. | 235/492 |
| 2009/0132898 A1 | * | 5/2009 | Nakamura et al. | 714/799 |
| 2009/0177954 A1 | * | 7/2009 | Takahashi et al. | 714/819 |
| 2010/0124258 A1 | * | 5/2010 | Sekiguchi et al. | 375/219 |

FOREIGN PATENT DOCUMENTS

| | | |
|---|---|---|
| JP | 2003-233787 | 8/2003 |
| JP | 2005-339141 | 12/2005 |
| JP | 2006-60363 | 3/2006 |
| JP | 2008-59271 | 3/2008 |
| WO | WO 2006110000 A1 * | 10/2006 |

OTHER PUBLICATIONS

SN5472, SN7472 and-Gated J-K Master-Slave Flip-Flops With Preset and Clear, 1988, Texas Instruments, Dallas, TX; located at http://www.ti.com/lit/ds/symlink/sn5472.pdf.*

* cited by examiner

*Primary Examiner* — Gennadiy Tsvey
(74) *Attorney, Agent, or Firm* — K&L Gates LLP

(57) ABSTRACT

A communication device includes determining means for determining a communication system of a transmission signal transmitted by another communication device that performs noncontact communication based on a periodical change of a binarized signal obtained by demodulation of the transmission signal transmitted from the other communication device.

15 Claims, 8 Drawing Sheets

TYPE A

ASK 100%-Miller (106bps)

TYPE B

ASK 10%-NRZ (106kbps)

TYPE F

ASK 10%-Manchester (212kbps,424kbps)

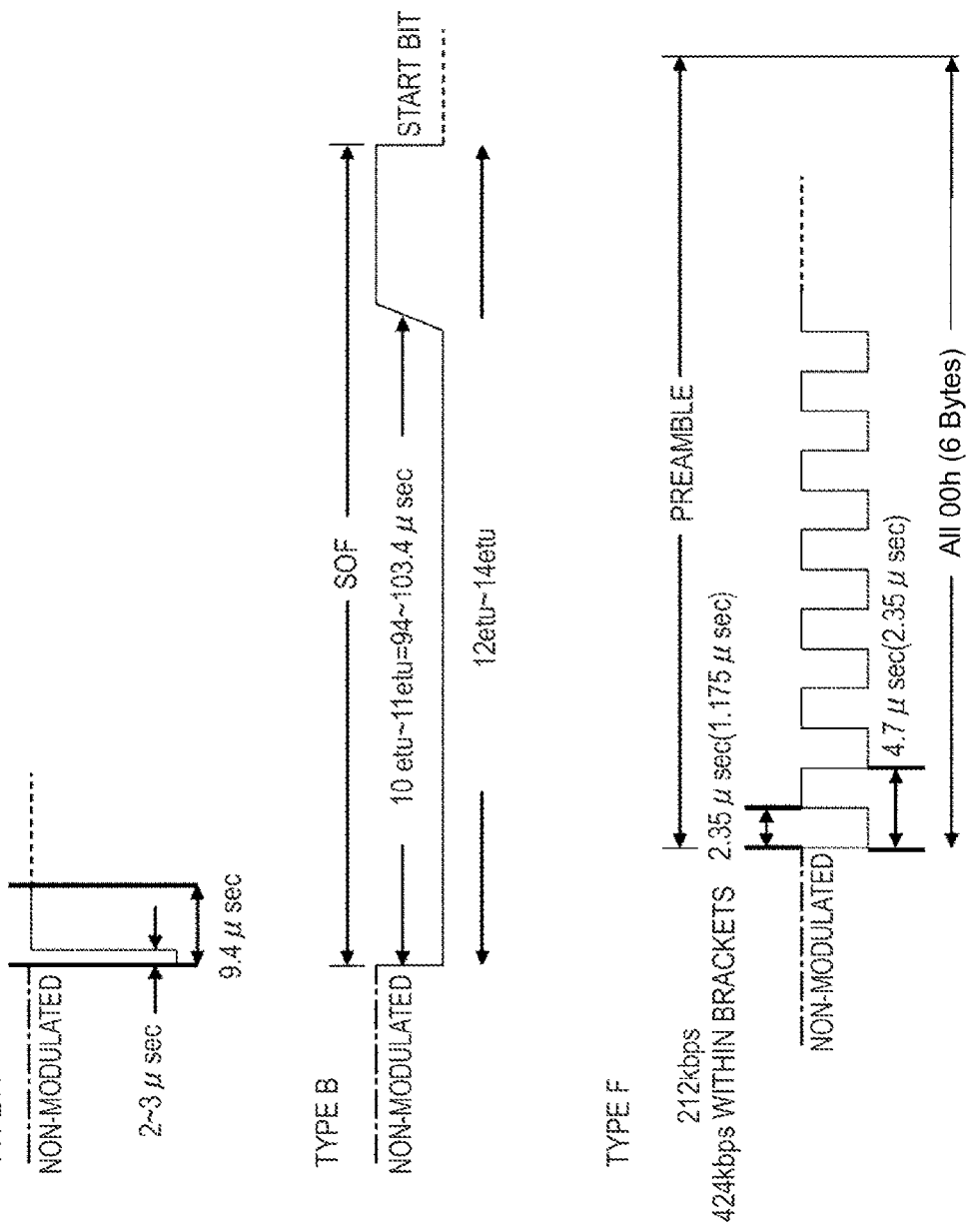

COMMUNICATION DEVICE, COMMUNICATION METHOD, AND PROGRAM

CROSS REFERENCES TO RELATED APPLICATIONS

The present application claims priority to Japanese Priority Patent Application JP 2009-074054 filed in the Japan Patent Office on Mar. 25, 2009, the entire contents of which is hereby incorporated by reference.

BACKGROUND

The present application relates to a communication device, a communication method, and a program, and specifically, to a communication device, a communication method, and a program that can establish communication with a simple configuration in a short time for plural communication systems.

Near field wireless communication systems for near-field wireless noncontact communication using IC (Integrated Circuit) cards are widely used. For example, uses for electronic tickets and electronic money are well known. Further, recently, cellular phones having functions of electronic tickets and electronic money by noncontact wireless communication have been in widespread use.

The near field wireless communication systems have been rapidly spread on a global scale and become international standards. For example, as the international standards, there are ISO/IEC 14443 as a standard of near-field IC card system, and ISO/IEC 18092 as a standard of FCIP (Near Field Communication Interface and Protocol)-1, etc.

The near field wireless communication according to ISO/IEC 18092 includes an active communication mode and a passive communication mode. The active communication mode is a communication mode of transmitting data by outputting electromagnetic waves respectively in plural communication devices for transmitting and receiving data, and modulating the electromagnetic waves. The passive communication mode is a mode of transmitting data by outputting electromagnetic waves in one communication device (initiator) of plural communication devices, and modulating the electromagnetic waves. Another one communication device (target) of the plural communication devices transmits data by load-modulating the electromagnetic waves output from the initiator.

Further, in the IC card system of ISO/IEC 14443, for example, there are various communication systems called Type A, Type B.

Type A is employed as MIFARE (registered trademark) system of Phillips. In Type A, data encoding by Miller is performed in data transfer from a reader writer to an IC card and data encoding by Manchester is performed in data transfer from the IC card to the reader writer. Further, in Type A, a data communication rate of 106 to 847 kbps (kilo bit per second) is employed.

In Type B, data encoding by NRZ is performed in data transfer from a reader writer to an IC card and data encoding by NRZ-L is performed in data transfer from the IC card to the reader writer. Further, in Type B, a data communication rate of 106 to 847 kbps is employed.

In the passive communication mode of ISO/IEC 18092 (hereinafter, referred to as "Type F"), data encoding by Manchester is performed in data transfer between a reader writer and an IC card. Further, in Type F, data communication rates of 212 kbps and 424 kbps are employed. The FeliCa (registered trademark) system of Sony as the applicant corresponds to Type F.

The above described various communication systems are standardized and operated, and there are applications compliant with plural communication system at the reader writer side.

On the other hand, at the IC card side, a platform in which plural applications may be installed in one IC card has been developed. Further, the IC card has been used in various uses not only the use for electric money but also the use for Basic Resident Resistor card etc., and is expected to become more popular. Accordingly, various technologies for the IC card to support plural communication systems have been proposed.

For example, a method of determining one communication system among plural communication systems by switching standby communication systems at fixed time intervals and determining a communication system by which correct decoding result is obtained and communication is established is proposed (e.g., see JP-A-2003-233787).

However, in the method, it may be possible that the time to establishment of communication becomes longer. On this account, there is a method of saving the communication history in the past, and performing trials of communication establishment preferentially from the communication system having the highest possibility of establishment of communication (e.g., see JP-A-2005-339141).

Further, a method of providing reception circuits respectively corresponding to plural communication systems, simultaneously executing reception processing with the circuits, and performing the subsequent communication using a communication system in which reception has been confirmed is proposed (e.g., see JP-A-2006-060363 and JP-A-2008-059271).

SUMMARY

However, according to the method of switching communication systems at fixed time intervals as proposed in JP-A-2003-233787, the time to start of the communication may be longer as described above. In the case of using the history in the past as in JP-A-2005-339141, although the probability of starting the communication in a shorter time than in the case of not using the history in the past may be higher, but the problem is not fundamentally solved because the next communication system and the communication systems used for communication in the past may have no relation to each other.

In the case where the reception circuits respectively corresponding to plural communication systems are provided as proposed in JP-A-2006-060363 and JP-A-2008-059271, although the time to start of communication may be reduced, the circuit size is increased and the manufacturing cost becomes higher. Further, in the method of JP-A-2006-060363, it is necessary to prepare sampling circuits in the number of the plural communication systems to be detected.

It is desirable to realize establishment of communication with a simple configuration in a short time for plural communication systems.

A communication device according to an embodiment includes determining means for determining a communication system of a transmission signal transmitted by another communication device that performs noncontact communication based on a periodical change of a binarized signal obtained by demodulation of the transmission signal transmitted from the other communication device.

A communication method according to an embodiment using a communication device that performs noncontact communication with another communication device includes the step of determining a communication system of a transmission signal transmitted by the other communication device based on a periodical change of a binarized signal obtained by demodulation of the transmission signal transmitted from the other communication device.

A program according to an embodiment allows a computer to function as determining means for determining a communication system of a transmission signal transmitted by another communication device that performs noncontact communication based on a periodical change of a binarized signal obtained by demodulation of the transmission signal transmitted from the other communication device.

In an embodiment, a communication system of a transmission signal transmitted by another communication device based on a periodical change of a binarized signal obtained by demodulation of the transmission signal transmitted from the other communication device.

The program may be provided by transmission via a transmission medium or recording in a recording medium.

The communication device may be an independent device or an internal block forming one device.

According to an embodiment, communication can be established with a simple configuration in a short time for plural communication systems.

Additional features and advantages are described herein, and will be apparent from the following Detailed Description and the figures.

BRIEF DESCRIPTION OF THE FIGURES

FIG. 2 shows binarized signals resulting from demodulation of transmission waveforms at the start of communication of Type A, Type B, and Type F.

DETAILED DESCRIPTION

The present application will be described in detail below with reference to the drawings according to an embodiment.

[Explanation of Communication System of Communication Performed by IC Card of Embodiment]

An IC (Integrated Circuit) card 1 (FIG. 3) to which an embodiment is applied is a communication device that performs noncontact communication with a reader writer (not shown) as another communication device. The IC card 1 supports plural communication systems and determines the communication system of the transmission signal transmitted by the reader writer according to a predetermined determination method. Then, the IC card 1 responds in the communication system obtained as a determination result, and makes communication with the reader writer.

Specifically, when first and second determination methods are employed, the IC card 1 can determine a communication system called Type B of ISO/IEC 14443 and a communication system of a passive communication mode of ISO/IEC 18092. In the passive communication mode of ISO/IEC 18092, there are two types of communication rates of 212 kbps (kilo bit per second) and 424 kbps. In the first and second determination methods, the difference between the communication rates can be determined.

Further, when a third determination method is employed, the IC card 1 can determine Type A of ISO/IEC 14443 in addition to Type B of ISO/IEC 14443 and the passive communication mode of ISO/IEC 18092 at communication rates of 212 kbps and 424 kbps.

Accordingly, first, the respective communication systems of Type A and Type B of ISO/IEC 14443 and the passive communication mode of ISO/IEC 18092 will be briefly explained.

As below, Type A and Type B of ISO/IEC 14443 will be simply referred to as "Type A" and "Type B". Further, the communication systems of the communication in the passive communication mode of ISO/IEC 18092 at the communication rates of 212 kbps and 424 kbps are appropriately referred to as "Type F at 212 kbps and 424 kbps".

Figure 1A:
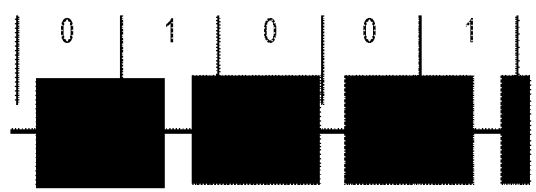
FIGS. 1A to 1C show transmission waveforms in respective communication systems of Type A, Type B, and Type F.
Figure 1B:
Figure 1C:
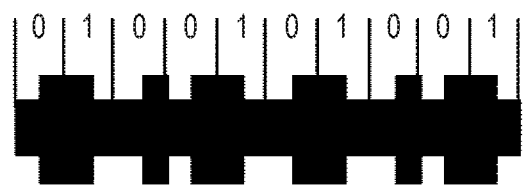

FIGS. 1A to 1C show waveforms of transmission signals (transmission waveforms) transmitted from a reader writer in the respective communication systems of Type A, Type B, and Type F.

FIG. 1A shows a transmission waveform of Type A.

In Type A, ASK (amplitude Shift Keying) modulation at 100% of modulation degree is employed for the modulation method when data is transmitted from a reader writer to the IC card 1.

In Type A, logical "0" is expressed by a waveform having a modulated part in an initial predetermined period in a section indicating 1 bit and non-modulated in the subsequent part, or a waveform constantly non-modulated in the section indicating 1 bit. Which one of the waveforms expressing the logical "0" is employed depends on the waveform (logical value) immediately before.

On the other hand, logical "1" is expressed by a waveform having a modulated part at the center of the section indicating 1 bit. The modulated parts of the logical "0" and the logical "1" are determined in 2 to 3 μsec.

As the encoding method, encoding by Miller is adopted in data transfer from the reader writer to the IC card 1 and encoding by Manchester is adopted in data transfer from the IC card 1 to the reader writer. The data communication rate is 106 kbps. Type A is employed as MIFARE (registered trademark) of Phillips.

FIG. 1B shows a transmission waveform of Type B.

In Type B, ASK modulation at 10% of modulation degree is employed for the modulation method when data is transmitted from a reader writer to the IC card 1.

In Type B, the logical "0" is expressed by a waveform modulated constantly at 10% of modulation degree in the section indicating 1 bit. On the other hand, the logical "1" is expressed by a waveform constantly non-modulated in the section indicating 1 bit.

As the data encoding method, encoding by NRZ is adopted in data transfer from the reader writer to the IC card 1 and encoding by NRZ-L is adopted in data transfer from the IC card 1 to the reader writer. The data communication rate is 106 kbps.

In Type B, BPSK (Binary Phase Shift Keying) modulation is used as the modulation method at transmission from the IC card 1 to the reader writer. Therefore, in Type B, the modulation methods are different between transmission and reception.

FIG. 1C shows a transmission waveform of Type F.

In Type F, ASK modulation at 10% of modulation degree is employed for the modulation method when data is transmitted from a reader writer to the IC card 1.

In Type F, the logical "0" is expressed by a waveform modulated at 10% of modulation degree in the first half and non-modulated in the second half of the section indicating 1 bit. On the other hand, the logical "1" is expressed by a waveform non-modulated in the first half and modulated at 10% of modulation degree in the second half of the section indicating 1 bit.

As the data encoding method, Manchester is adopted both in data transfer from the reader writer to the IC card 1 and in data transfer from the IC card 1 to the reader writer. There are two types of communication rates of 212 kbps and 424 kbps as descried above.

Accordingly, the respective communication systems have a commonality in that ASK modulation is used as the modulation method of transmission signals from the reader writer to the IC card 1.

Note that a time necessary for transmission of 1 bit is referred to as "1 etu" as the elementary time unit as below.

FIG. 2 shows binarized signals resulting from demodulation of transmission waveforms at the start of the respective communication systems of Type A, Type B, and Type F.

In Type A, the start of communication is defined to be modulated in the first 2 to 3 µsec of the initial 1 etu and non-modulated in the rest of the section according to the standard. The part after the initial 1 etu varies depending on data and is indefinite. Here, 1 etu in Type A is about 9.4 µsec because the communication rate is 106 kbps.

On the other hand, in Type B, the start of communication is defined such that the SOF (Start of Frame) from 12 to 14 etu is first transmitted according to the standard. The SOF should be the logical "0" by the first 10 etu, and change to the logical "1" between 10 etu and 11 etu. Note that 1 etu in Type B is about 9.4 µsec because the communication rate is 106 kbps. Therefore, in Type B, a rising edge is first detected between 94 µsec to 103.4 µsec from the first trailing edge.

In Type F, the start of communication is defined such that a preamble field including at least 48 bits of logical "0" is first transmitted according to the standard.

After the preamble field, a Sync field, a length field, a payload field, a CRC (Cyclic Redundancy Checking) field are sequentially transmitted.

In Type F, when the communication rate is 212 kbps, 1 etu is about 4.7 µsec. On the other hand, when the communication rate is 424 kbps, 1 etu is about 2.35 µsec, a half of that in the case of 212 kbps.

IC card 1 respectively determine Type A, Type B, and Type F having the above described transmission waveforms and binarized signals.

[Configuration Example of IC Card 1]

Figure 3:
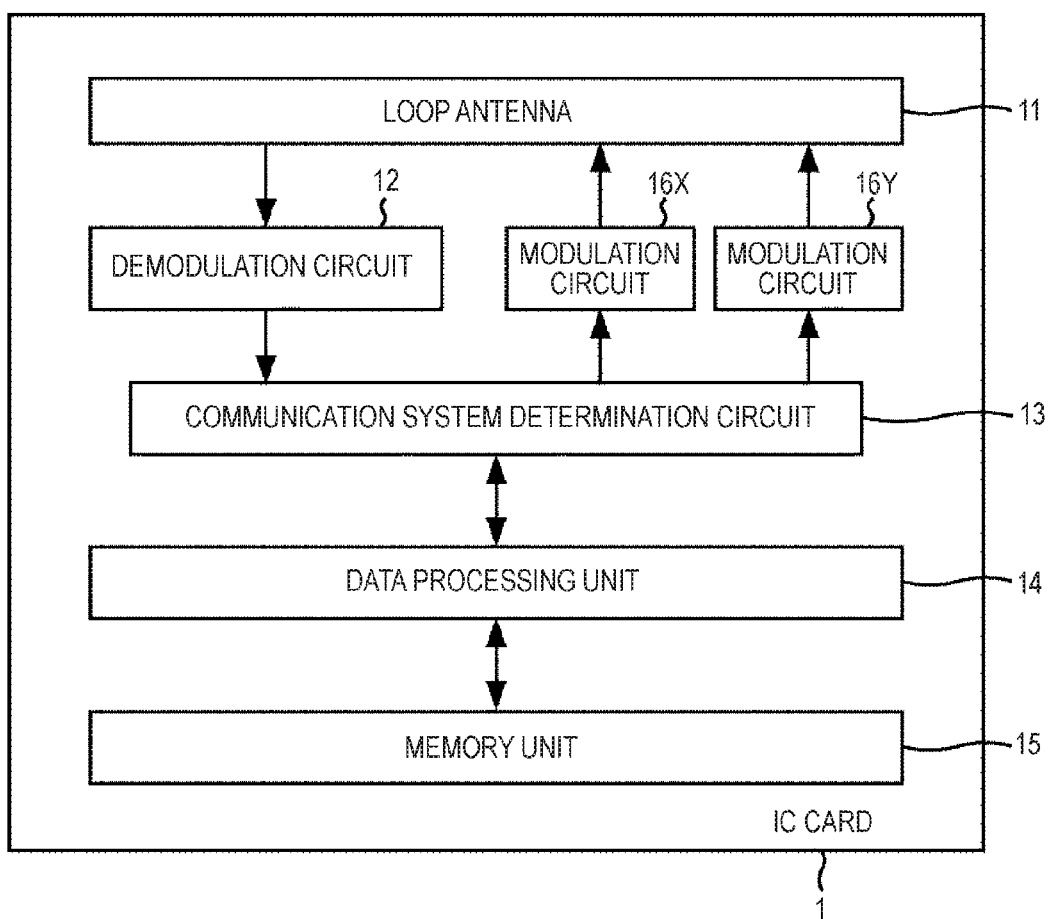
FIG. 3 is a block diagram showing a configuration example of an IC card to which an embodiment is applied.

FIG. 3 is a block diagram showing a configuration example of the IC card 1.

The IC card 1 includes a loop antenna 11, a demodulation circuit 12, a communication system determination circuit 13, a data processing unit 14, a memory unit 15, a modulation circuit 16X, and a modulation circuit 16Y.

The loop antenna 11 receives electromagnetic wave output from a reader writer. In the loop antenna 11, a current flows by electromagnetic induction due to the electromagnetic wave from the reader writer.

The demodulation circuit 12 demodulates an ASK-modulated signal (ASK signal) received by the loop antenna 11, and supplies a resulting binarized signal to the communication system determination circuit 13. The demodulation circuit 12 can generate a clock signal at a carrier wave frequency fc=13.56 MHz by performing tuning and detection of the current flowing in the loop antenna 11.

The communication system determination circuit 13 determines the communication system of the transmission signal transmitted from the reader writer according to the periodical change of the binarized signal. Further, the communication system determination circuit 13 confirms the format according to the communication system as the determination result and supplies the acquired data to the data processing unit 14.

For example, when the communication system is Type F, data is transmitted in a format in which the Sync field, the length field, and the CRC field are arranged after the preamble field, and the communication system determination circuit 13 checks them. Then, the communication system determination circuit 13 supplies data contained in the payload field to the data processing unit 14.

Furthermore, the communication system determination circuit 13 supplies the transmission data supplied from the data processing unit 14 and to be transmitted to the reader writer to the modulation circuit 16X or 16Y supporting the determined communication system.

The data processing unit 14 includes a CPU (Central Processing Unit), a ROM (Read Only Memory), etc. (not shown). The CPU executes a program stored in the memory unit 15, and thereby, the data processing unit 14 executes predetermined processing corresponding to the data supplied from the communication system determination circuit 13. Further, the data processing unit 14 supplies the data to be transmitted to the reader writer to the communication system determination circuit 13 as a processing result.

The memory unit 15 includes an EEPROM (Electrically and Erasable Programmable Read Only Memory), a RAM (Random Access Memory), etc. The memory unit 15 stores programs to be executed by the data processing unit 14 and data necessary for operation of the data processing unit 14.

The modulation circuits 16X and 16Y perform modulation according to the data supplied from the communication system determination circuit 13. That is, the modulation circuits 16X and 16Y change the impedance when the loop antenna 11 is externally regarded as a coil according to the data supplied from the communication system determination circuit 13. As the impedance of the loop antenna 11 as the coil changes, the RF field around the loop antenna 11 formed when the reader writer outputs electromagnetic wave changes. Thereby, the carrier wave as the electromagnetic wave output by the reader writer is modulated (load-modulated) according to the data supplied from the communication system determination circuit 13, and the data output by the data processing unit 14 to the communication system determination circuit 13 is transmitted to the reader writer that outputs the electromagnetic wave.

The modulation circuit 16X performs modulation corresponding to Type A and Type F. That is, the modulation circuit 16X performs modulation by the ASK modulation method corresponding to the data supplied form the data processing unit 14.

On the other hand, the modulation circuit 16Y performs modulation corresponding to Type B. That is, the modulation circuit 16Y performs modulation by the BPSK modulation corresponding to the data supplied form the data processing unit 14.

In the case where the first or second determination method is executed in the IC card 1 having the above described configuration, Type B and Type F can be determined. Further, in the case where the third determination method is executed, Type A, Type B, and Type F can be determined. Then, noncontact communication with the reader writer can be performed based on the determination result.

[Concept of First Determination Processing]

First, first determination processing using the first determination method will be explained with reference to FIG. 4.

The first determination method determines Type B, Type F at 212 kbps, and Type F at 424 kbps by discriminating the difference between times when rising and trailing edges are detected in a binarized signal obtained by binarization of an ASK signal.

Figure 4:
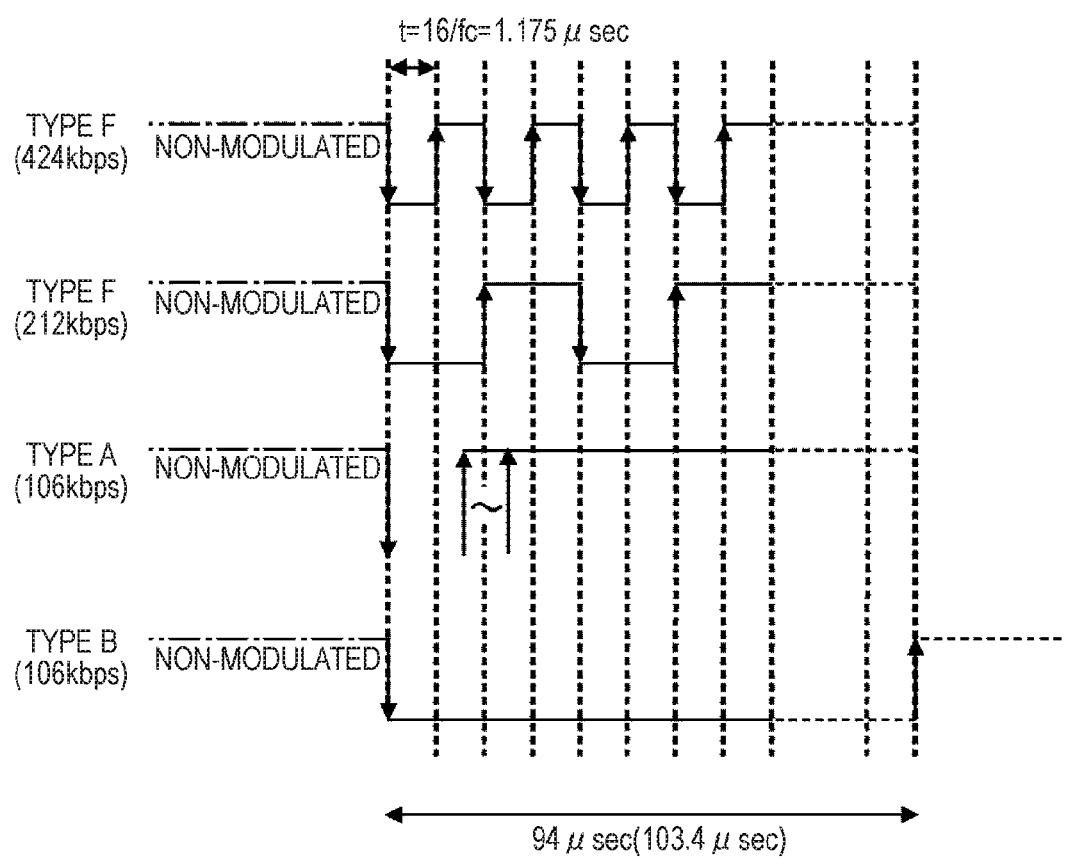
FIG. 4 is a diagram for explanation of first and second determination methods performed by the IC card 1.

FIG. 4 shows binarized signals at the start of communication obtained in the demodulation circuit 12.

Note that, although the communication systems to be determined by the first determination method are Type B, Type F at 212 kbps, and Type F at 424 kbps, FIG. 4 also shows the binarized signal of Type A for the third determination processing, which will be described later.

In the binarized signal of Type F at 424 kbps shown on the top of FIG. 4, after the first trailing edge is detected, rising and trailing edges are alternately detected with a predetermined period. Here, since 1 etu of Type F at 424 kbps is 32/fc, the period with which rising and trailing edges are alternately detected is a half, 16/fc.

In the second binarized signal of Type F at 212 kbps in FIG. 4, after the first trailing edge is detected, rising and trailing edges are alternately detected with a period of 32/fc.

On the other hand, in Type B, as explained by referring to FIG. 2, after the first trailing edge is detected, no rising or trailing edge is detected at least by 94 μsec. Therefore, in the binarized signal of Type B, a rising edge is first detected at the time after a lapse of 94 μsec from the first trailing edge.

As described above, in the first determination method, in the case where, after the first trailing edge is detected, rising and trailing edges are alternately detected with the period of 16/fc, the communication system determination circuit 13 determines the communication system of the reader writer as Type F at 424 kbps. Further, in the case where, after the first trailing edge is detected, rising and trailing edges are alternately detected with the period of 32/fc twice the period of 16/fc, the communication system determination circuit 13 determines the communication system of the reader writer as Type F at 212 kbps. Furthermore, in the case where, after the first trailing edge is detected, a rising edge is first detected at the time after a lapse of 94 μsec to 103.4 μsec, the communication system determination circuit 13 determines the communication system of the reader writer as Type B.

Here, the minimum period of 16/fc with which rising and trailing edges are alternately detected is equal to ½ etu of Type F at 424 kbps having the shortest 1 etu of the respective communication systems of Type B, Type F at 212 kbps, and Type F at 424 kbps to be detected.

[First Determination Processing]

The first determination processing of the IC card 1 will be explained with reference to a flowchart of FIG. 5.

First, at step S1, the demodulation circuit 12 detects and demodulates the ASK signal received by the loop antenna 11 and determines whether a trailing edge has been detected with respect to the resulting binarized signal or not. Then, the demodulation circuit 12 repeats the processing of step S1 until the circuit determines that a trailing edge has been detected. Note that the processing of generating the binarized signal from the ASK signal is continuously executed until the first determination processing ends.

If the determination that a trailing edge of the binarized signal has been detected is made at step S1, the process moves to step S2, and the demodulation circuit 12 starts detection of rising and trailing edges of the binarized signal.

At step S3, the demodulation circuit 12 determines whether rising and trailing edges have been alternately detected with a period of 16/fc or not.

If the determination that rising and trailing edges have been alternately detected with the period of 16/fc is made at step S3, the process moves to step S4. On the other hand, if the determination that rising and trailing edges have not been alternately detected with the period of 16/fc is made at step S3, the process moves to step S7, which will be described later.

At step S4, the demodulation circuit 12 provides a notification that rising and trailing edges have been alternately detected with the period of 16/fc to the communication system determination circuit 13.

Note that the notification from the demodulation circuit 12 to the communication system determination circuit 13 may be provided to the communication system determination circuit 13 at each time when a rising or trailing edge is detected, or may be provided to the communication system determination circuit 13 at the time when a predetermined number of rising and trailing edges are detected. In the embodiment, the demodulation circuit 12 provides a notification to the communication system determination circuit 13 at each time when a rising or trailing edge is detected. The notification is the same at step S8, which will be described later.

Then, the communication system determination circuit 13 that has received the notification that rising and trailing edges had been alternately detected with the period of 16/fc determines the communication system as Type F at 424 kbps and checks the format at step S5. That is, the communication system determination circuit 13 checks whether the preamble field, the Sync field, the length field, and the CRC field can be read out according to specifications of Type F and contents of them are correct or not.

At step S6, the communication system determination circuit 13 determines whether it is certain that the communication system is Type F at 424 kbps or not. If the determination that it is certain that the communication system is Type F at 424 kbps is made at step S6, that is, if the preamble field, the Sync field, the length field, and the CRC field can be read out according to specifications of Type F and contents of them are correct, the process moves to step S15. On the other hand, if the determination that the communication system is not Type F at 424 kbps is made at step S6, the first determination processing ends.

Further, if the determination that rising and trailing edges have not been alternately detected with the period of 16/fc is made at step S3, the process proceeds to step S7 where the demodulation circuit 12 determines whether rising and trailing edges have been alternately detected with a period of 32/fc or not.

If the determination that rising and trailing edges have been alternately detected with the period of 32/fc is made at step S7, the process moves to step S8. On the other hand, if the determination that rising and trailing edges have not been alternately detected with the period of 32/fc is made at step S7, the process moves to step S11, which will be described later.

At step S8, the demodulation circuit 12 provides a notification that rising and trailing edges have been alternately detected with the period of 32/fc to the communication system determination circuit 13.

The communication system determination circuit 13 that has received the notification that rising and trailing edges had been alternately detected with the period of 32/fc determines the communication system as Type F at 212 kbps and checks the format at step S9. That is, the communication system determination circuit 13 checks whether the preamble field, the Sync field, the length field, and the CRC field can be read out according to specifications of Type F and contents of them are correct or not.

At step S10, the communication system determination circuit 13 determines whether it is certain that the communication system is Type F at 212 kbps or not. If the determination that it is certain that the communication system is Type F at 212 kbps is made at step S10, that is, if the preamble field, the Sync field, the length field, and the CRC field can be read out according to specifications of Type F and contents of them are correct, the process moves to step S15. On the other hand, if the determination that the communication system is not Type F at 212 kbps is made at step S10, the first determination processing ends.

At step S11, the demodulation circuit 12 determines whether the rising edge has been detected at the time of 94 μsec or 103.4 μsec after the trailing edge of the binarized signal is first detected or not.

If the determination that rising edge has not been detected at the time of 94 μsec or 103.4 μsec after the trailing edge of the binarized signal is first detected is made at step S11, the first determination processing ends.

On the other hand, if the determination that rising edge has been detected at the time of 94 μsec or 103.4 μsec after the trailing edge of the binarized signal is first detected is made at step S11, the process moves to step S12. At step S12, the demodulation circuit 12 provides a notification that the rising edge has been detected at the time of 94 μsec or 103.4 μsec after the trailing edge of the binarized signal is first detected to the communication system determination circuit 13.

The communication system determination circuit 13 that has received the notification that the rising edge had been detected at the time of 94 μsec or 103.4 μsec after the trailing edge of the binarized signal is first detected determines that the communication system as Type B and checks the format at step S13. That is, the communication system determination circuit 13 checks whether the SOF (Start Of Frame), the EOF (End Of Frame), and the CRC can be read out according to specifications of Type B and contents of them are correct or not.

Then, at step S14, the communication system determination circuit 13 determines whether it is certain that the communication system is Type B or not. If the determination that it is certain that the communication system is Type B is made at step S14, that is, if the SOF, the EOF, and the CRC can be read out according to specifications of Type B and contents of them are correct, the process moves to step S15. On the other hand, if the determination that the communication system is not Type B is made at step S14, the first determination processing ends.

At step S15, the communication system determination circuit 13 extracts data contained in the frame according to the format of the communication system respectively determined at step S5, S9, or S13, and supplies the data to the data processing unit 14. Further, the communication system determination circuit 13 supplies the data supplied from the data processing unit 14 as a response corresponding to the transmission from the reader writer to the modulation circuit 16X or 16Y corresponding to the determination result.

Through the above operation, the first determination processing ends.

In the first determination processing, the communication system determination circuit 13 determines the communication system based on the period with which rising and trailing edges of the binarized signal are detected. Further, the communication system determination circuit 13 confirms the format of the determined communication system.

[Concept of Second Determination Processing]

Next, second determination processing using the second determination method will be explained with reference to FIG. 4 again.

The second determination method determines Type B, Type F at 212 kbps, and Type F at 424 kbps by discriminating the difference between times when a rising edge of the binarized signal.

That is, in the binarized signal of Type F at 424 kbps, after the first trailing edge is detected, rising edges are detected with a period of 32/fc.

On the other hand, in the binarized signal of Type F at 212 kbps, after the first trailing edge is detected, rising edges are detected with a period of 64/fc.

Further, in the second binarized signal of Type B, after the first trailing edge is detected, no rising or trailing edge is detected at least by 94 μsec, and, at earliest, a rising edge is first detected at the time after a lapse of 94 μsec from the first trailing edge.

Therefore, in the second determination method, in the case where rising edges are detected with the period of 32/fc, the communication system determination circuit 13 determines the communication system of the reader writer as Type F at 424 kbps. On the other hand, in the case where rising edges are detected with the period of 64/fc, the communication system determination circuit 13 determines the communication system of the reader writer as Type F at 212 kbps. Further, in the case where, after the first trailing edge is detected, a rising edge is detected at the time of 94 μsec or 103.4 μsec, the communication system determination circuit 13 determines the communication system of the reader writer as Type B.

[Second Determination Processing]

Figure 6:
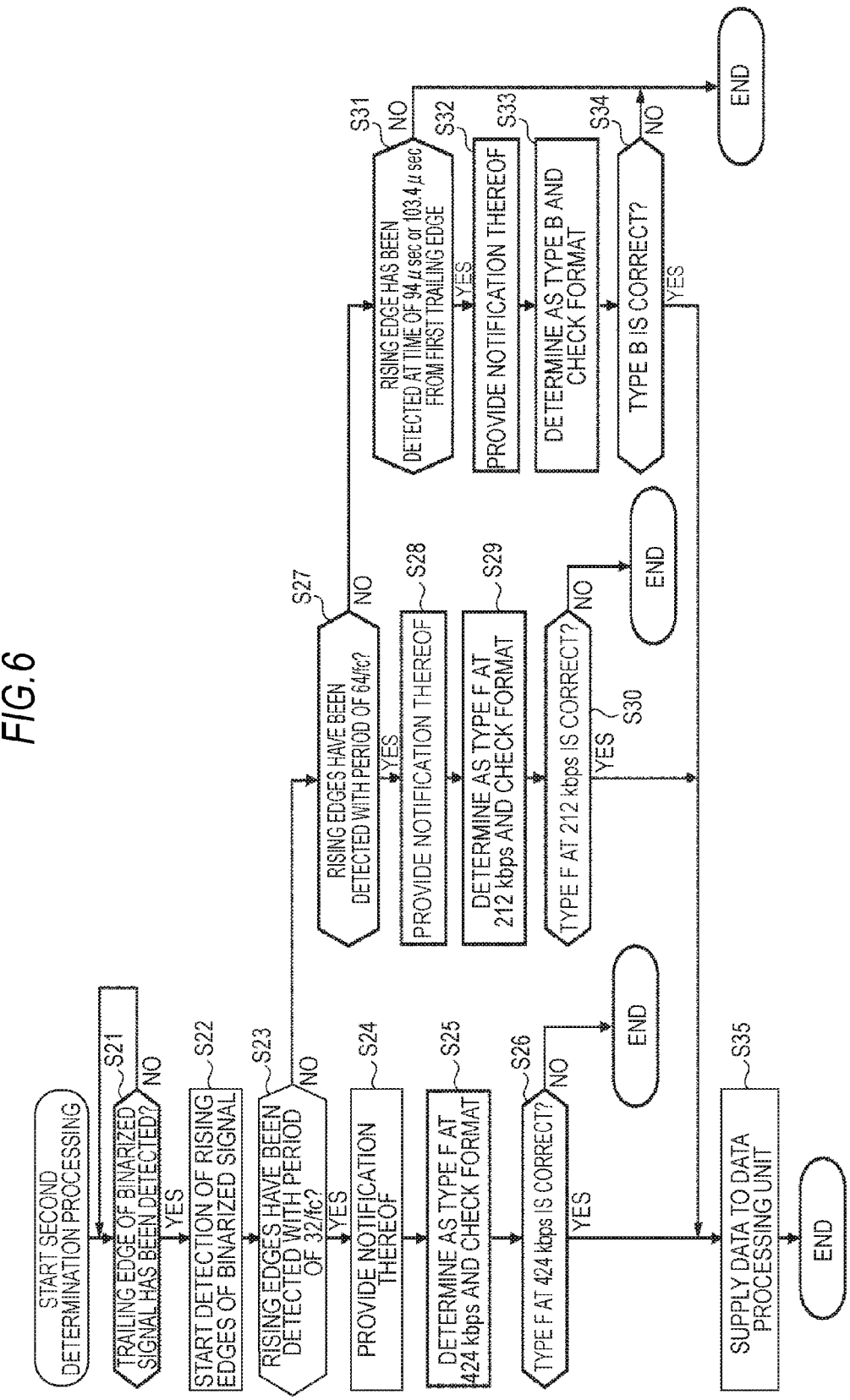
FIG. 6 is a flowchart for explanation of second determination processing.

The second determination processing of the IC card 1 will be explained with reference to a flowchart of FIG. 6.

First, at step S21, the demodulation circuit 12 detects and demodulates the ASK signal received by the loop antenna 11 and determines whether a trailing edge has been detected with respect to the resulting binarized signal or not. Then, the demodulation circuit 12 repeats the processing of step S21 until the circuit determines that a trailing edge has been detected. The processing is the same as the above described processing at step S1.

If the determination that a trailing edge of the binarized signal has been detected is made at step S21, the process moves to step S22, and the demodulation circuit 12 starts detection of rising edges of the binarized signal.

At step S23, the demodulation circuit 12 determines whether rising edges have been detected with a period of 32/fc or not.

If the determination that rising edges have been detected with the period of 32/fc is made at step S23, the process moves to step S24. On the other hand, if the determination that rising edges have not been detected with the period of 32/fc is made at step S23, the process moves to step S27, which will be described later.

At step S24, the demodulation circuit 12 provides a notification that rising edges have been detected with the period of 32/fc to the communication system determination circuit 13.

Note that, in the second determination processing, the notification may be provided to the communication system determination circuit 13 at each time when a rising edge is detected, or may be provided to the communication system determination circuit 13 at the time when a predetermined number of rising edges are detected with the period of 32/fc.

In the embodiment, the demodulation circuit 12 provides a notification to the communication system determination circuit 13 at each time when a rising edge is detected with the period of 32/fc. The notification is the same at step S28, which will be described later.

Figure 5:
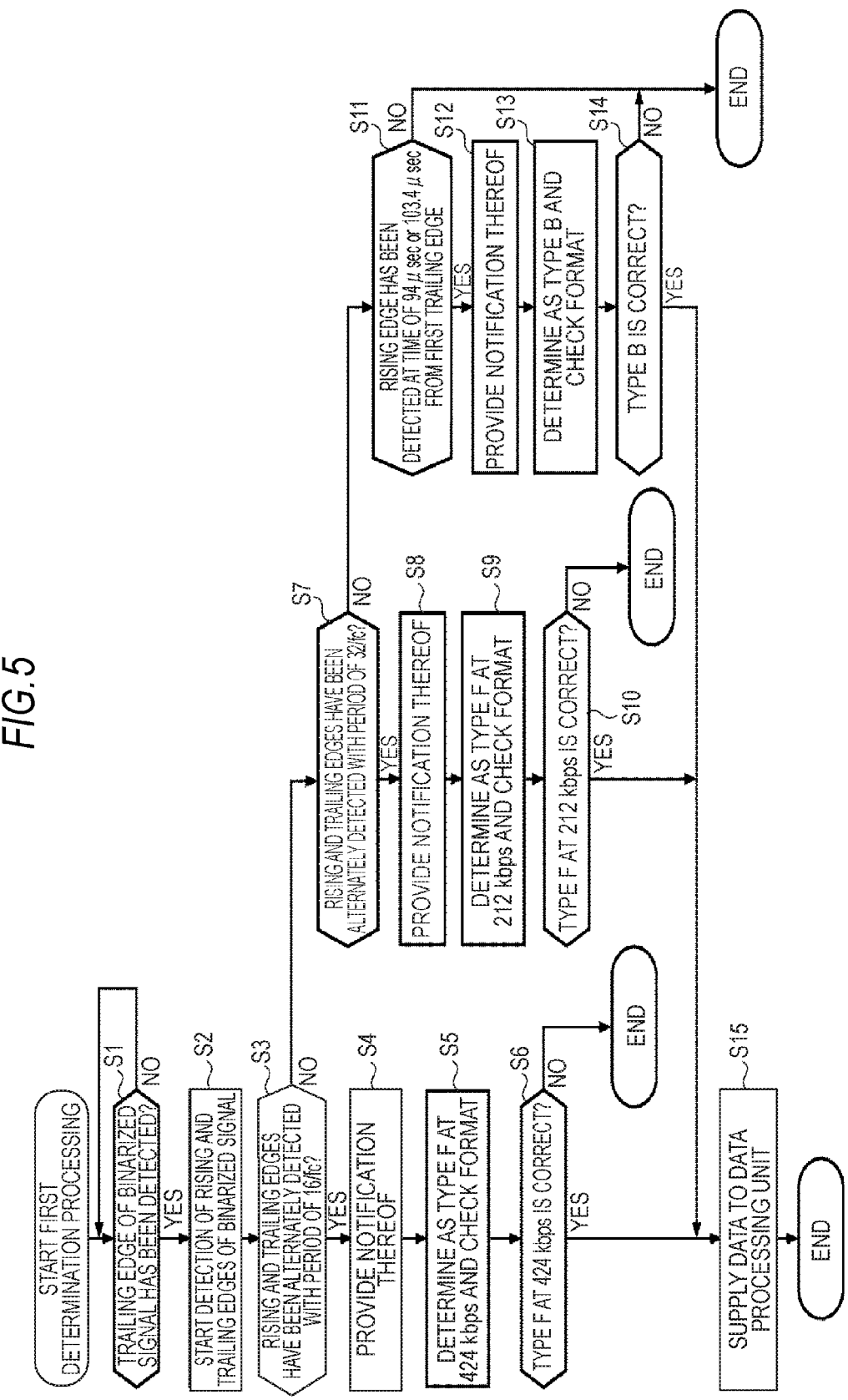
FIG. 5 is a flowchart for explanation of first determination processing.

The processing at steps S25 and S26 is the same as the processing at steps S5 and S6 in FIG. 5, and the explanation will be omitted.

If the determination that rising edges have not been detected with the period of 32/fc is made at step S23, the process proceeds to step S27 where the demodulation circuit 12 determines whether rising edges have been detected with a period of 64/fc or not.

If the determination that rising edges have been detected with the period of 64/fc is made at step S27, the process moves to step S28. On the other hand, if the determination that rising edges have not been detected with the period of 64/fc is made at step S27, the process moves to step S31, which will be described later.

At step S28, the demodulation circuit 12 provides a notification that rising edges have been detected with the period of 64/fc to the communication system determination circuit 13.

The processing at steps S29 and S30 is the same as the processing at steps S9 and S10 in FIG. 5, and the explanation will be omitted.

If the determination that rising edges have not been detected with the period of 64/fc is made at step S27, the process proceeds to step S31 where the demodulation circuit 12 determines whether the rising edge has been detected at the time of 94 μsec or 103.4 μsec after the trailing edge of the binarized signal is first detected or not.

If the determination that rising edge has not been detected at the time of 94 μsec or 103.4 μsec after the trailing edge of the binarized signal is first detected is made at step S31, the second determination processing ends.

On the other hand, if the determination that rising edge has been detected at the time of 94 μsec or 103.4 μsec after the trailing edge of the binarized signal is first detected is made at step S31, the process moves to step S32. At step S32, the demodulation circuit 12 provides a notification that the rising edge has been detected at the time of 94 μsec or 103.4 μsec after the trailing edge of the binarized signal is first detected to the communication system determination circuit 13.

The processing at steps S33 to S35 is the same as the processing at steps S13 to S15 in FIG. 5, and the explanation will be omitted.

Through the above operation, the second determination processing ends.

In the second determination processing, the communication system determination circuit 13 determines the communication system based on the period with which rising edges of the binarized signal are detected. Further, the communication system determination circuit 13 also confirms the format of the determined communication system.

In the above described first and second determination processing, the communication system of the reader writer can be determined within a time of receiving the SOF in Type B, and within a time of receiving the preamble field in Type F. Therefore, the determination can be made faster (in a shorter time) than in the case of determination after reception of the entire frame.

Further, even if the determination result of the communication system based on the information on times of rising and trailing edges is erroneous, the error can be detected in the check of the format to be subsequently executed.

The IC card 1 does not finish the above described first and second determination processing in one execution, but can repeatedly execute the processing. Thereby, for example, even in the case where the error has been detected in the check of the format in the first execution, the correct communication system can be determined in the second or subsequent execution and communication with the reader writer can be started.

[Concept of Third Determination Processing]

Next, third determination processing using the third determination method will be explained with reference to FIG. 7.

The third determination method determines the communication system from a result obtained by the predetermined number of times of detection of the signal level of the binarized signal according to the combination of the communication systems to be determined. In the third determination method, as described above, all communication systems of Type A, Type B, Type F at 212 kbps, and Type F at 424 kbps can be determined, and an example of the method will be explained according to FIG. 7.

First, the communication system determination circuit 13 detects a trailing edge of the binarized signal supplied from the demodulation circuit 12. In the above described first and second determination processing, the demodulation circuit 12 detects the trailing edge of the binarized signal, however, in the third determination processing, the communication system determination circuit 13 receives the supply of the binarized signal from the demodulation circuit 12 and detects the trailing edge.

Then, the communication system determination circuit 13 sets a time after a lapse of t/2 time when the period of 16/fc is t from the time when the first trailing edge of the binarized signal is detected to a base time T0. Then, the communication system determination circuit 13 detects the signal level of the binarized signal at the predetermined number of times after a lapse of t time including the base time T0.

Here, how many times the level of the binarized signal is detected varies depending on the combination of communication systems to be determined. In other words, the number of times varies depending on the types of the communication systems in which the reader writer may transmit.

In the embodiment, an example of determining all communication systems of Type A, Type B, Type F at 212 kbps, and Type F at 424 kbps will be explained. In this case, it is necessary for the communication system determination circuit 13 to perform detection at five times including the detection of the signal level at the base time T0.

Figure 7:
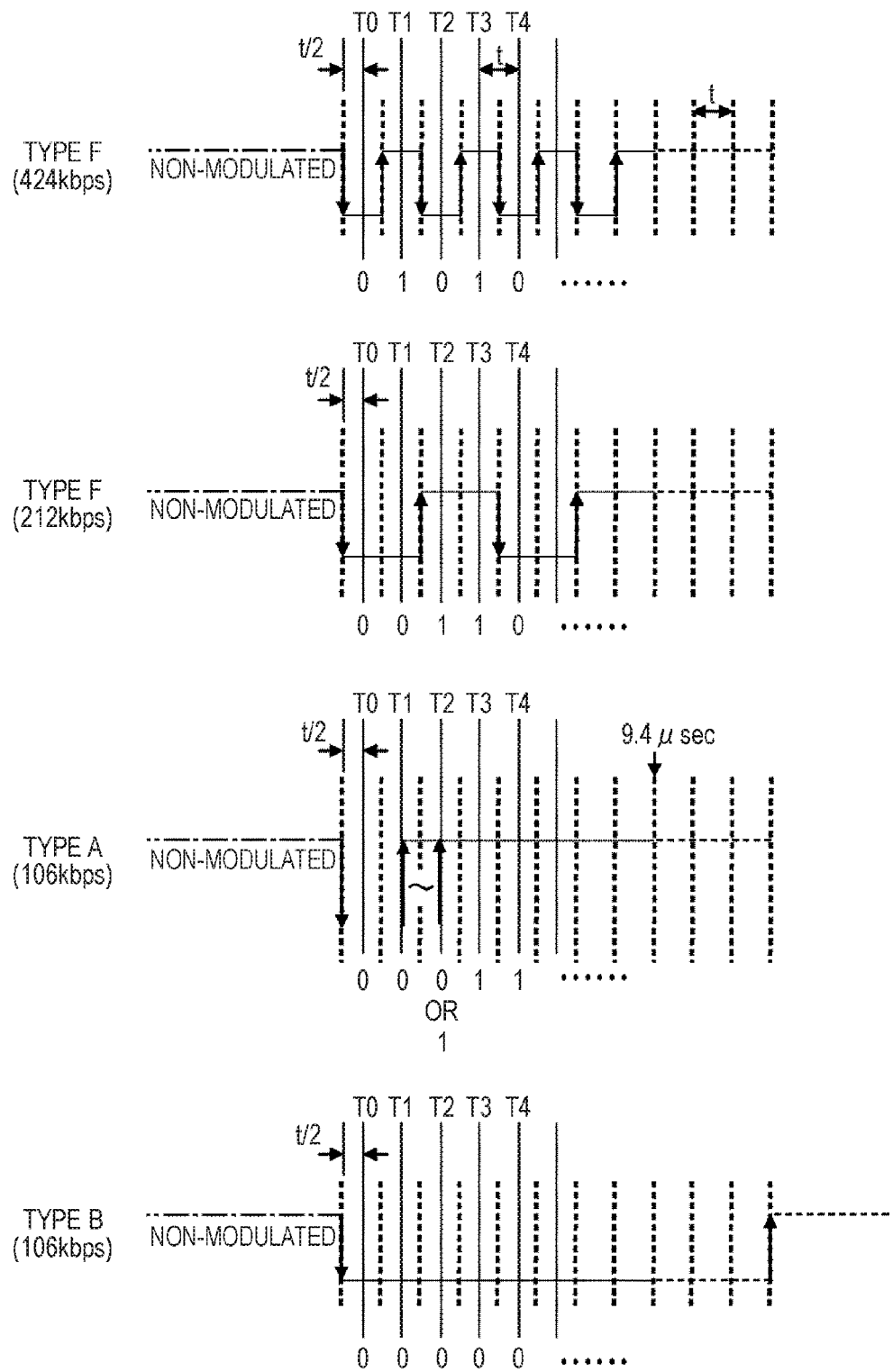
FIG. 7 is a diagram for explanation of a third determination method performed by the IC card 1.

Referring to FIG. 7, results of detection of the signal levels of the binarized signals of the respective communication systems will be explained regarding the five times of T1, T2, T3, T4 at each time after a lapse of t time from the base time T0.

In FIG. 7, the high (Hi) signal level is expressed by "1", and the low (Low) signal level is expressed by "0".

In the case where the communication system is Type F at 424 kbps, the binarized signal has repeats rising and trailing edges at t time intervals (with a period of 16/fc) from the first trailing edge. Therefore, the signal levels of the binarized signal at the times T0, T1, T2, T3, T4 are "0", "1", "0", "1", "0", respectively.

On the other hand, in the case where the communication system is Type F at 212 kbps, the binarized signal repeats rising and trailing edges at 2t time intervals (with a period of 32/fc) from the first trailing edge. Therefore, the signal levels of the binarized signal at the times T0, T1, T2, T3, T4 are "0", "0", "1", "1", "0", respectively.

Further, in the case where the communication system is Type A, the binarized signal takes zero from the first trailing edge to at least 2 μsec and definitely takes one after 3 μsec from the first trailing edge to 9.4 μsec as shown in FIG. 2. The value may change between 2 μsec and 3 μsec from the first trailing edge.

The time T1 is before a lapse of 2 μsec from the first trailing edge, and the time T2 is between 2 μsec and 3 μsec from the first trailing edge. Therefore, the signal levels of the binarized signal at the times T0, T1, T2, T3, T4 are "0", "0", "0" or "1", "1", "1", respectively.

Finally, in the case where the communication system is Type B, the binarized signal takes zero from the first trailing edge to 94 μsec. Therefore, the signal levels of the binarized signal at the times T0, T1, T2, T3, T4 are "0", "0", "0", "0", "0", respectively.

Accordingly, all communication systems of Type A, Type B, Type F at 212 kbps, and Type F at 424 kbps can be determined by detection of the five signal levels of the binarized signal at least at the times T0, T1, T2, T3, T4.

That is, the communication system determination circuit 13 determines the communication system as Type F at 424 kbps when the five signal levels of the binarized signal at the times T0, T1, T2, T3, T4 are "0", "1", "0", "1", "0", respectively.

The communication system determination circuit 13 determines the communication system as Type F at 212 kbps when five signal levels of the binarized signal at the times T0, T1, T2, T3, T4 are "0", "0", "1", "1", "0", respectively.

The communication system determination circuit 13 determines the communication system as Type A when five signal levels of the binarized signal at the times T0, T1, T2, T3, T4 are "0", "0", "0" or "1", "1", "1", respectively.

The communication system determination circuit 13 determines the communication system as Type B when five signal levels of the binarized signal at the times T0, T1, T2, T3, T4 are "0", "0", "0", "0", "0", respectively.

In this manner, the communication system determination circuit 13 can determine the communication system based on the result of the signal levels of the binarized signal at the total of five times including the base time T0 at each time after a lapse of t time from the base time T0.

As described above, how many times the level of the binarized signal is determined varies depending on the combination of communication systems to be determined. For example, in the case where only three communication systems of Type F at 424 kbps, and Type F at 212 kbps, and Type B are determined, a total of four times of detection of signal levels of the binarized signal may be performed. The determination can be made, when the four signal levels of the binarized signal are "0", "1", "0", "1", as Type F at 424 kbps, when the four signal levels of the binarized signal are "0", "0", "1", "1", as Type F at 212 kbps, and, when the four signal levels of the binarized signal are "0", "0", "0", "0", as Type B.

Further, the period with which the signal levels are detected varies depending on the combination of communication systems to be determined. For example, in the case where Type F at 424 kbps is not included in the communication systems to be determined, the period with which the signal levels are detected may be a period of 32/fc. That is, the period with which the signal levels are detected may be a half of 1 etu, which is the shortest among the communication systems to be determined, or less. Note that the number of times of detection can be made smallest when the period with which the signal levels are detected is set to a half of 1 etu, which is the shortest among the communication systems to be determined, and, when the period is made shorter, the number of times of detection of the signal levels of the binarized signal increases.

The communication system determination circuit 13 includes a CPU, a ROM, etc., and the CPU executes a program stored in the memory unit 15, and thereby, the circuit executes the above described third determination processing. Further, the period and the number of times of detection of signal levels can be stored as parameters in the memory unit 15. Thereby, in the case where the communication systems to be determined are decided according to the application of the IC card 1, the period and the number of times according to the communication system to be determined can easily be set. In this manner, various combinations of communication systems to be determined can flexibly be responded and determination in a short time according to the communication system to be determined can be performed.

[Third Determination Processing]

Figure 8:
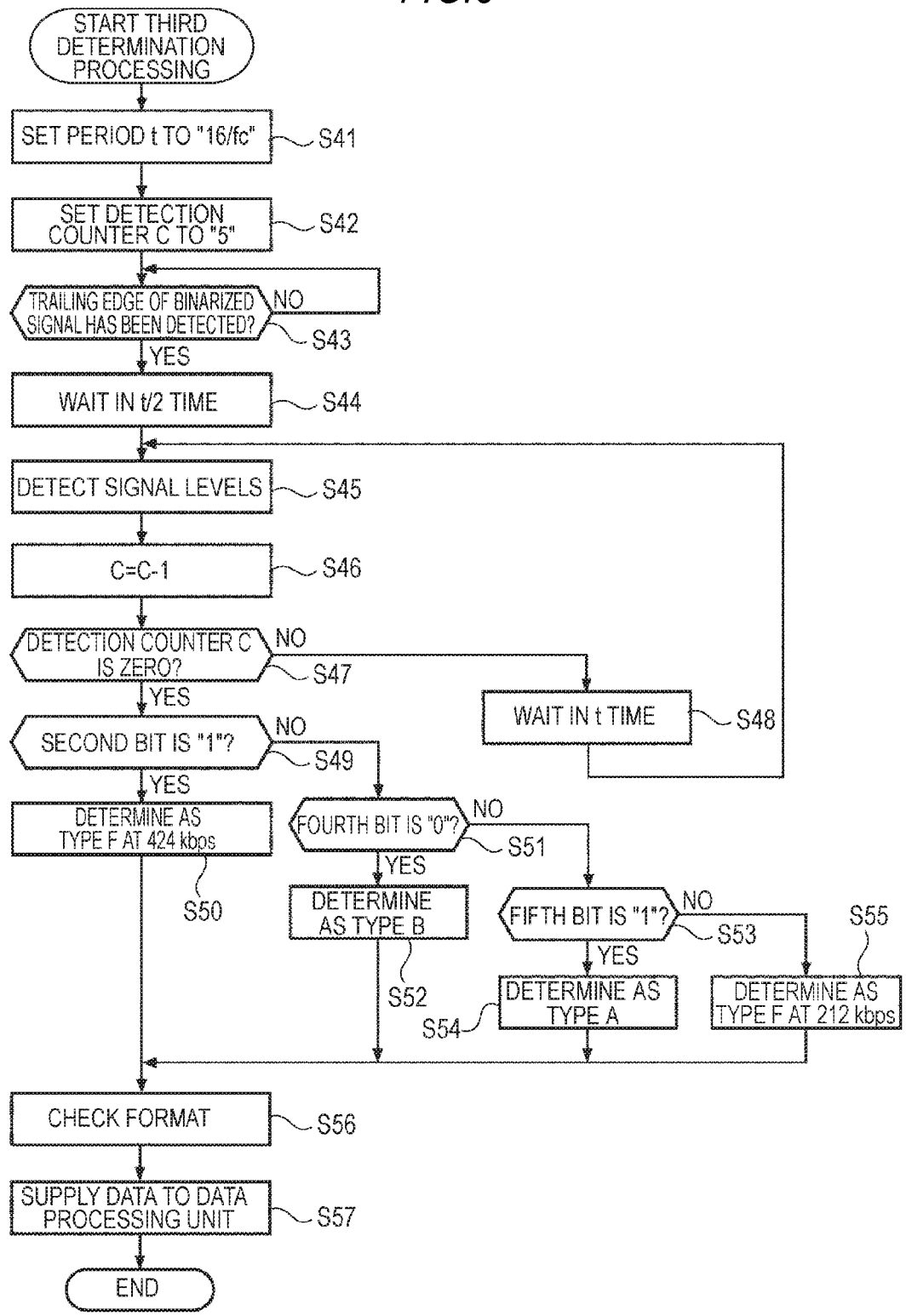
FIG. 8 is a flowchart for explanation of third determination processing.

FIG. 8 is a flowchart for explanation of third determination processing. This processing is executed when the electromagnetic wave from the reader writer is received and supply of power to the respective units of the IC card 1 is started.

First, the communication system determination circuit 13 reads out the program stored in the memory unit 15 and reads out and sets a period t stored as a parameter in the memory unit 15 at step S41. In the embodiment, "16/fc" is stored as the period t in the memory unit 15, and the communication system determination circuit 13 sets the period t to "16/fc".

At step S42, the communication system determination circuit 13 reads out and sets a detection counter C stored as a parameter for deciding the number of times of detection of signal levels from the memory unit 15. In the embodiment, "5" is stored as the detection counter C in the memory unit 15, and the communication system determination circuit 13 sets the detection counter C to "5".

At step S43, the communication system determination circuit 13 determines whether a trailing edge of the binarized signal has been detected or not, and waits until the determination that a trailing edge of the binarized signal has been detected is made.

If the determination that a trailing edge of the binarized signal has been detected is made at step S43, the process moves to step S44, and the communication system determination circuit 13 waits in t/2 time from the time when the trailing edge is detected. The t time in the embodiment is equal to a period of 16/fc.

Then, after a lapse of t/2 time, the communication system determination circuit 13 detects a signal level of the binarized signal as step S45. The detection of the signal level at step S45 is detection at the base time T0.

At step S46, the communication system determination circuit 13 sets a new detection counter C to a value obtained by subtracting one from the detection counter C.

Then, at step S47, the communication system determination circuit 13 determines whether the detection counter C is zero or not. If the determination that the detection counter C is not zero is made at step S47, the process moves to step S48. At step S48, the communication system determination circuit 13 waits in t time and the process is returned to step S45 after a lapse of t time.

The processing at steps S45 to 48 is repeated until the determination that the detection counter C is zero is made at step S47 after the process is returned to step S45. The detected signal level when the detection counter C is "4" corresponds to the signal level at base time T1, and the detected signal level when the detection counter C is "3" corresponds to the signal level at base time T2. Further, the signal levels detected when the detection counter C is "2", "1", "0" correspond to the signal levels at base times T2, T3, T4, respectively.

Then, if the determination that the detection counter C is zero is made at step S47, the process moves to step S49, and the communication system determination circuit 13 determines whether the signal level of the second bit is "1" or not.

If the determination that signal level of the second bit is "1" is made at step S49, that is, if the signal level of the base time T1 is "1", the process proceeds to step S50 where the communication system determination circuit 13 determines the communication system of the reader writer as Type F at 424 kbps.

On the other hand, if the determination that signal level of the second bit is not "1" is made at step S49, the process proceeds to step S51 where the communication system determination circuit 13 determines whether the signal level of the fourth bit is "0" or not.

If the determination that signal level of the fourth bit is "0" is made at step S51, that is, if the signal level of the base time T3 is "0", the process proceeds to step S52 where the communication system determination circuit 13 determines the communication system of the reader writer as Type B.

On the other hand, if the determination that signal level of the fourth bit is not "0" is made at step S51, the process proceeds to step S53 where the communication system determination circuit 13 determines whether the signal level of the fifth bit is "1" or not.

If the determination that signal level of the fifth bit is "1" is made at step S53, that is, if the signal level of the base time T4 is "1", the process proceeds to step S54 where the communication system determination circuit 13 determines the communication system of the reader writer as Type A.

On the other hand, if the determination that signal level of the fifth bit is not "1" is made at step S53, the process proceeds to step S55 where the communication system determination circuit 13 determines the communication system of the reader writer as Type F at 212 kbps.

After the processing at steps S50, S52, S54, or S55, the process proceeds to step S56 where the communication system determination circuit 13 checks the format according to the determined communication system. This processing is the same as the processing at steps S5, S6, S9, S10, S13, and S14 in FIG. 5.

That is, when determining the communication system as Type F at 212 kbps or 424 kbps, the communication system determination circuit 13 confirms whether the preamble field, the Sync field, the length field, and the CRC field can be read out and contents of them are correct or not.

On the other hand, when determining the communication system as Type A, the communication system determination circuit 13 confirms whether the parity, the end bit indicating the end of communication can be read out and contents of them are correct or not.

Further, when determining the communication system as Type B, the communication system determination circuit 13 confirms whether the SOF, EOF, CRC can be read out and contents of them are correct or not.

If it is impossible to read out data in the format corresponding to the determined communication system, this means that the determination result is erroneous, and the communication system determination circuit 13 ends the third determination processing.

On the other hand, if the data is normally read out, the communication system determination circuit 13 supplies the read out data to the data processing unit 14 at step S57. Further, the communication system determination circuit 13 supplies data supplied from the data processing unit 14 as a response corresponding to the transmission from the reader writer to the modulation circuit 16X or 16Y corresponding to the determination result.

Through the operation, the third determination processing ends.

According to the third determination processing, the communication system can be determined according to the detection result when the signal levels of the binarized signal are detected with the predetermined period at the predetermined number of times. In the case where all communication systems of Type A, Type B, Type F at 212 kbps, and Type F at 424 kbps are determined, the communication system can be determined by the detection of the signal levels of the binarized signal with the period of 16/fc (t time) at five times. In this case, determination can be made within 5t time and the determination can be made faster than the determination after reception of the entire frame.

Further, like the first and second determination processing, the confirmation of the format is also performed, and therefore, even if the determination result of the communication system is erroneous, the error can be detected.

Furthermore, the IC card 1 can repeatedly execute the third determination processing. Thereby, for example, if the error of the determination result is detected by the check of the format in the first execution, the correct communication system can be determined by the second or subsequent execution and communication with the reader writer can be started.

The third determination processing is executed by software processing based on the programs and parameters stored in the memory unit 15, and thereby, can flexibly respond various combinations of communication systems to be determined. Further, determination in a short time according to various combinations of communication systems to be determined can be performed.

As described above, according to the IC card 1 to which the embodiments of the invention are applied, plural communication systems can be supported and communication can be established in a short time for any communication system. Further, it is not necessary to provide reception circuits respectively corresponding to the plural communication systems, the simple configuration may be employed and the IC card 1 can be manufactured at low cost. That is, according to the IC card 1, communication can be established with the simple configuration in a short time for the plural communication systems.

Note that the device that performs the first to third determination processing, which has been explained as the IC card 1 in the above described examples, is not limited to the IC card, but may be an IC tag, a cellular phone, or the like other than the card type. That is, the communication device that performs noncontact communication by executing the first to third determination processing may be incorporated into an electronic device having other functions as a part thereof.

In this specification, the steps described in the flowcharts contain not only the processing that is time-sequentially performed in the described order but also the processing not necessarily time-sequentially performed but performed in parallel or individually.

The embodiments of the invention are not limited to the above described embodiments, but various changes may be made without departing from the scope of the invention.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A communication device comprising determining means for determining a communication system of a transmission signal transmitted by another communication device that performs noncontact communication based on a periodical change of a binarized signal obtained by demodulation of the transmission signal transmitted from the other communication device,
    wherein after detecting a first edge, the determining means is configured to detect a plurality of signal levels of the binarized signal within a first period of at most 64/(carrier wave frequency) to determine the communication system, wherein the determining means determines the communication system based on a second period with which rising edges of the binarized signal are detected, and wherein the first period is a half of 1 etu (elementary time unit), which is the shortest among the communication systems to be determined, or less.

2. The communication device according to claim 1, wherein the determining means determines the communication system based on a second period with which rising and trailing edges of the binarized signal are detected.

3. The communication device according to claim 1, wherein the determining means determines the communication system based on a second period with which rising edges of the binarized signal are detected.

4. The communication device according to claim 1, wherein a communication rate of the communication system to be determined is one of 106 kbps, 212 kbps, or 424 kbps, and the period is 16/(carrier wave frequency).

5. The communication device according to claim 1, further comprising modulating and demodulating means for modulating and demodulating the transmission signal.

6. The communication device according to claim 5, wherein a modulation method of the modulating and demodulating means is ASK.

7. The communication device according to claim 1, wherein the determining means further determines the communication system of the transmission signal by confirming a format of the communication system as a determination result after determination of the communication system.

8. The communication device according to claim 1, comprising an IC card or a cellular phone.

9. The communication device according to claim 1, wherein the signal levels are detected based on at least one of a rising edge and a trailing edge.

10. A communication method using a communication device that performs noncontact communication with another communication device, the method comprising the step of determining a communication system of a transmission signal transmitted by the other communication device based on a periodical change of a binarized signal obtained by demodulation of the transmission signal transmitted from the other communication device,
    wherein after detecting a first edge, a determining means is configured to detect a plurality of signal levels of the binarized signal within a first period of at most 64/(carrier wave frequency) to determine the communication system, wherein the determining means determines the communication system according to a detection result when signal levels of the binarized signal are detected with a second period at a predetermined number of times, and wherein the first period is a half of 1 etu (elementary time unit), which is the shortest among the communication systems to be determined, or less.

11. A non-transitory computer readable medium storing a computer program which, when executed, causes a computer to function as determining means for determining a communication system of a transmission signal transmitted by another communication device that performs noncontact communication based on a periodical change of a binarized signal obtained by demodulation of the transmission signal transmitted from the other communication device,
    wherein after detecting a first edge, a determining means is configured to detect a plurality of signal levels of the binarized signal within a first period of at most 64/(carrier wave frequency) to determine the communication system, wherein the determining means determines the communication system according to a detection result when signal levels of the binarized signal are detected with a second period at a predetermined number of times, and wherein the first period is a half of 1 etu (elementary time unit), which is the shortest among the communication systems to be determined, or less.

12. A communication device comprising a determining unit configured to determine a communication system of a transmission signal transmitted by another communication device that performs noncontact communication based on a periodical change of a binarized signal obtained by demodulation of the transmission signal transmitted from the other communication device,
    wherein after detecting a first edge, the determining unit is configured to detect a plurality of signal levels of the binarized signal within a first period of at most 64/(carrier wave frequency) to determine the communication system, wherein the determining unit determines the communication system according to a detection result when signal levels of the binarized signal are detected with a second period at a predetermined number of times, and wherein the first period is a half of 1 etu (elementary time unit), which is the shortest among the communication systems to be determined, or less.

13. A non-transitory computer readable medium storing a computer program which, when executed, causes a computer to determine a communication system of a transmission signal transmitted by another communication device that performs noncontact communication based on a periodical change of a binarized signal obtained by demodulation of the transmission signal transmitted from the other communication device,
    wherein after detecting a first edge, a determining unit is configured to detect a plurality of signal levels of the binarized signal within a first period of at most 64/(carrier wave frequency) to determine the communication system, wherein the determining unit determines the communication system according to a detection result when signal levels of the binarized signal are detected with a second period at a predetermined number of times, and wherein the first period is a half of 1 etu (elementary time unit), which is the shortest among the communication systems to be determined, or less.

14. A communication device comprising determining means for determining a communication system of a transmission signal transmitted by another communication device that performs noncontact communication based on a periodical change of a binarized signal obtained by demodulation of the transmission signal transmitted from the other communication device,
    wherein after detecting a first edge, the determining means is configured to detect a plurality of signal levels of the binarized signal within a first period of at most 64/carrier wave frequency) to determine the communication system, wherein the determining means determines the communication system based on five signal levels detected within the first period.

15. A communication device comprising determining means for determining a communication system of a transmission signal transmitted by another communication device that performs noncontact communication based on a periodical change of a binarized signal obtained by demodulation of the transmission signal transmitted from the other communication device,
    wherein after detecting a first edge, the determining means is configured to detect a plurality of signal levels of the binarized signal within a first period of at most 64/(carrier wave frequency) to determine the communication system, wherein the determining means determines the communication system based on four signal levels detected within the first period.

\* \* \* \* \*